UNITED STATES PATENT OFFICE.

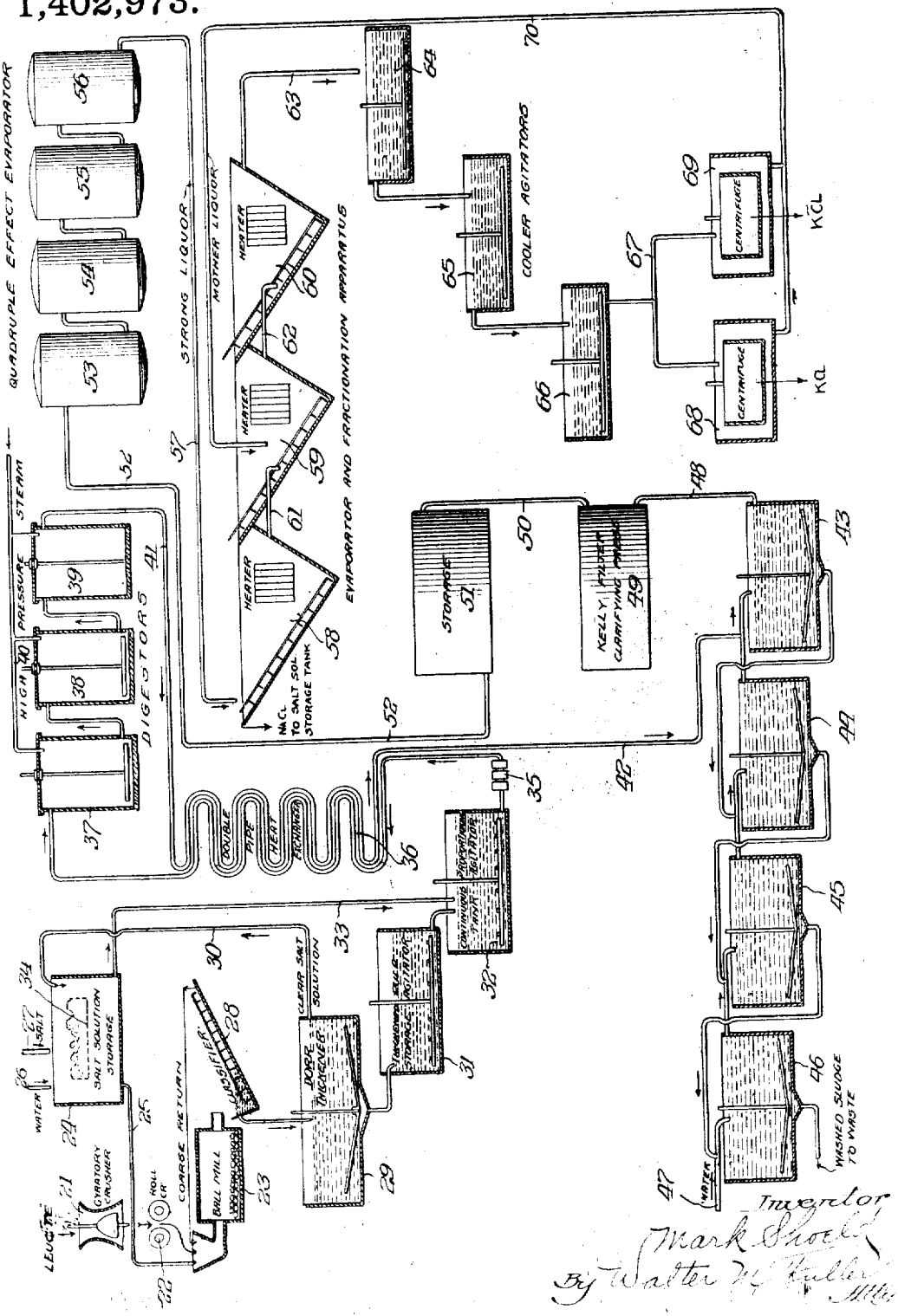

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF POTASSIUM CHLORIDE.

1,402,973.     Specification of Letters Patent.     Patented Jan. 10, 1922.

Application filed November 17, 1920. Serial No. 424,574.

*To all whom it may concern:*

Be it known that I, MARK SHOELD, a citizen of the United States, residing at Chicago, in the county of Cook and State of Illinois, have invented certain new and useful Improvements in the Production of Potassium Chloride, of which the following is a specification.

My invention relates to novel processes or methods capable of being worked on a commercial scale for the recovery of the potash from leucite or wyomingite, containing a double silicate of aluminum and potassium, or similar minerals, its prime object being the removal or extraction of the potash from the mineral, hence rendering it available, by substituting a suitable base therefor, as by the employment of a solution of a relatively common and cheap salt and the use of appropriate pressure and suitable temperature.

One important feature of the invention resides in the continuity of the process whereby it can be economically practiced, a further valuable characteristic being the desirable and effective wet grinding of the mineral in the salt solution, the ingredients of the resulting pulp being subsequently brought to the proper ratio or proportion as a greater amount of the salt solution is required for the grinding than can later be employed to advantage during the digestion of the sludge under heat and pressure.

Additional features of the invention provide for the use of a salt solution not too concentrated and the avoidance of too high a steam pressure during the digestion, which, of course, tends to economy in the practice of the process.

Another purpose of the invention is to employ the salt, or at least a part of it, fractioned out of the strong liquor separated from the waste sludge, the latter being preferably washed, in the treatment of further material in the proportioning tank preliminary to the digestion.

In its preferred form, the invention comprises the crushing of the leucite or other similar mineral to a suitable size and then grinding it wet with a common salt or sodium chloride solution, whereupon the sludge is thickened, the clear salt-solution passing back to the salt-solution storage tank, the thickened pulp flowing to a storage tank where it is subjected to agitation to prevent settling. From such tank the material goes to a proportioning tank where a proper amount of salt-solution is added to secure the required ratio of ingredients. Then it is fed to a group of digesters subjected to high steam pressure to secure the desired temperature and pressure, which digesters it traverses in sequence, whereupon the liquid flows through a double pipe heat exchanger to give up a portion of its heat to the material passing to the digesters. In the digesters the desired chemical transformation takes place, that is to say, the sodium of the solution is substituted for the potassium in the mineral, the potassium now being present as potassium chloride in the solution, the latter also containing a portion of sodium chloride by reason of the excess originally employed. By fractional evaporation or otherwise the solid sodium chloride and solid potassium chloride are removed from the strong liquor, the former being returned for further use in carrying on the process, the latter representing the desired product, which may be used as a fertilizer or employed otherwise in the art.

In order that those skilled in this art may have a full and complete understanding of the process and the manner of carrying out the same, I have illustrated in the accompanying drawing, somewhat diagrammatically, a convenient apparatus which may be employed in this connection, and to this drawing reference should be had in connection with the following detailed description.

Referring to the drawing, it will be perceived that the leucite or similar mineral is fed continuously to a gyratory or other suitable crusher 21, by which it is reduced to one and one-half to two inch size, from which it passes to a roll crusher 22 of the customary form which further reduces it to five to ten mesh size, and from the latter crusher it goes directly to a rotary ball-mill 23 of the usual construction to which also a sodium chloride solution is fed through a pipe 25 from a salt-solution storage or supply tank 24, whereby economical wet grinding of the mineral to a fineness of approximately 100 mesh occures in the mill.

By means of suitable supplies of water 26 and sodium chloride 27, the storage-tank 24 may be maintained properly filled with the salt-solution of proper strength or specific gravity.

The discharge from the ball-mill flows into an inclined, single-deck classifier 28 of the standard and well-known Dorr type which returns the coarse material to the ball-mill for further grinding, the pulp continuously overflowing into a Dorr thickener 29 where it is dewatered to approximately 40 per cent solids.

The clear salt-solution from the upper part of the thickener, which may be equipped with an appropriate agitator, is returned by a connection 30 to the salt-solution supply-tank 24, the thickened pulp passing without interruption from the bottom part of the appliance 29 to a storage-agitator 31 from which it flows continuously into a proportioning-tank 32 supplied with a proper agitator or stirrer.

A suitable amount of salt-solution is fed ceaselessly to the proportioning-tank through a connection 33 from the supply-tank 24, whereby the proper ratio of ingredients in the material may be easily and continuously maintained.

Water and fresh salt are added to the supply-compartment 24 from time to time, as may be required to maintain a strength of about 20 to 25 per cent sodium chloride, the latter being conveniently handled by a screen-basket 34 suspended in the solution.

More of the solution is needed for the wet grinding than is suitable or economical for the subsequent treatment in the digesters, hence the proper amount of solution is constantly fed to the ball-mill from the supply-tank, the clear salt-solution being continuously removed from the pulp in the thickener and returned to such tank, and then the material is proportioned in tank 32 by the steady addition of salt-solution from the supply to provide a sludge containing by weight approximately three parts of ground leucite, one part of sodium-chloride, and four to five parts of water.

A triplex-pump 35 takes the material from the proportioning-tank and passes it through one pipe of a double-pipe heat-exchange 36, by which it is preliminarily heated, into a group or system of three digesters, 37, 38 and 39 which it traverses in series and wherein it is agitated or stirred and subjected to heat and pressure by the introduction into the digesters through pipes 40 of live steam of approximately 200 pounds pressure per square inch, whereby the temperature of the material undergoing treatment in the digesters is maintained in the neighborhood of 200 degrees centigrade.

The speed of flow of the material is such that it remains in the digesters ordinarily from thirty minutes to one hour, three-quarters of an hour being a fair average, at the end of which period the interchange of the sodium of the solution and the potassium of the mineral will have taken place, the solution aside from its suspended solids now containing both potassium chloride and sodium chloride, the latter by reason of its original excess in the solution.

Upon leaving the last digester, the sludge passes through a conduit 41, the companion pipe of the heat-exchanger where it imparts or delivers a portion of its heat to the material entering the digesters through the other pipe, and a connection 42 to four Dorr thickeners 43, 44, 45 and 46 acting as washers, wherein the insoluble material is completely and thoroughly washed by water introduced through a pipe 47 into the final washer or thickener 46 and which flows on the launders or troughs of the several washers in sequence countercurrent to the sludge. As is clearly illustrated, the liquid in each thickener or washer overflows into the next one just below it, the sludge removed from the bottom of each washer being carried up to the next one, where it encounters the overflow from the washer above, before it is delivered into such intermediate washer. The washed sludge in which the potassium has been replaced by the sodium leaves the final thickener 46 and passes out as waste.

The strong solution from washer 43 is pumped continuously through a connection 48, a clarifying press 49, preferably of the Kelly type, and a connection 50 to a storage-chamber 51, from which the clear liquor is continuously drawn or introduced through a connection 52 into the fourth effect portion 53 of a quadruple-effect evaporator 53, 54, 55, 56 of the ordinary construction, the liquor, as is indicated, traversing the four portions or sections of such evaporator in series and continuously leaving the part 56 as a concentrated solution at boiling temperature.

Through a suitable connection 57 the hot solution or strong liquor is run through a system of three, open evaporators 58, 59 and 60 acting unitedly as a fractionation apparatus wherein the sodium chloride is precipitated out and scraped up along the slightly-inclined side-walls (in much the same way as in a Dorr classifier) and delivered into the next section, the solid sodium chloride being discharged from the part 58 and returned for use in the salt-solution storage-tank 24. The solution flows through the appliance countercurrent or in the opposite direction to the travel of the sodium chloride, being delivered from each section of the evaporator, through the connection 61 or 62 as the case may be, into the next one part way down its inclined wall so as not to interfere with the salt traveling upwardly on the top portion of such wall.

Upon leaving the final evaporator 60 the strong potassium chloride liquor passes through a connection 63 to a system of three cooler agitators 64, 65 and 66 which it traverses in series.

From the last of these coolers the mixture of crystallized potassium-chloride and mother-liquor is run through a connection 67 to either one of two centrifuges 68 and 69, the latter being used alternately to permit removal of the potassium chloride from the previously active but now idle centrifuge. The mother-liquor from these centrifugal separators is returned to the middle section or part 59 of the fractionation evaporator through a connection 70, and the dried or centrifuged potassium chloride is ready for shipment upon removal from the separator.

Suitable pumps are employed in the system at the points needed, but no attempt has been made to illustrate them.

It is to be understood that the process is continuous, the leucite being ground without interruption, the solid sodium chloride and potassium chloride being discharged continuously.

In the performance of the process as above specified, about 80 per cent to 90 per cent of the potassium in the mineral is replaced by the sodium. The invention, however, is not necessarily limited or confined to the exact details of the process set forth (such as the percentages of ingredients in the sludge, the fineness of grinding, the strength of the salt-solution, the pressure and temperature, etc.,) nor to the apparatus illustrated and described, but the specification of the process as presented is the preferred manner of practicing it so far as I am now advised.

Experience has indicated that if less water is used the percentage of conversion decreases, whereas if more water is employed there is no substantial increase in conversion. For example, if three parts of water are used instead of four to five parts, the conversion drops to about 70 per cent.

If more sodium chloride is used there is practically no improvement in conversion, and if less salt is availed of the conversion is reduced materially.

The specified pressure of 200 pounds per square inch seems to be the most expedient from a commercial standpoint. If the pressure is less, the chemical interchange or substitution correspondingly decreases, whereas if the pressure is increased substantially, there will be a small increase in conversion but not sufficient to warrant the maintenance of the higher pressure. For instance, if the pressure is raised to three to five hundred pounds we secure only one or two per cent increase in conversion.

The time of treatment of the material in the digesters is desirably from thirty minutes to one hour. If such period is reduced to under fifteen minutes, there is a perceptible drop in the chemical transposition, whereas if the time is increased, say to five hours, the increase in conversion is only about one per cent. The time factor, of course, may be modified as occasion requires to produce the most satisfactory results.

Those skilled in this art will understand, therefore, that the invention is not necessarily restricted to the precise and exact details of the process and apparatus set forth because these are subject to more or less radical modifications without departure from the substance and essence of the invention as defined by the appended claims and without sacrificing any of its substantial benefits and advantages.

I claim:

1. A process for the production of potassium chloride from leucite or the like, comprising wet grinding of the mineral in a sodium chloride solution, subsequent proportioning of the ingredients of the sludge by the addition of sodium chloride solution, subjecting the sludge to sufficient heat and pressure for a period of time to effect the interchange of the potassium of the mineral and the sodium of the solution, and removing the potassium chloride from the liquor, substantially as described.

2. A process for the production of potassium chloride from leucite or the like, comprising wet grinding of the mineral sodium chloride solution, subsequent proportioning of the ingredients of the sludge by the addition of sodium chloride, subjecting the sludge to sufficient heat and pressure for a period of time to effect the interchange of the potassium of the mineral and the sodium of the solution, separating the liquor from the solid material, removing the sodium chloride from the liquor, and removing the potassium chloride from such liquor, substantially as described.

3. A process for the production of potassium chloride from leucite or the like, comprising wet grinding of the mineral in a sodium chloride solution, thickening the resulting pulp by removing a portion of its salt solution, proportioning the ingredients of such sludge by the addition of salt solution, subjecting the sludge to heat and pressure for a period of time sufficient to effect the interchange of the potassium of the mineral and the sodium of the solution, and removing the potassium chloride from the liquor, substantially as described.

4. A process for the production of potassium chloride from leucite or the like, comprising wet grinding of the mineral in a sodium chloride solution, thickening the resulting pulp by removing a portion of its salt-solution, proportioning the ingredients of the sludge by the addition of salt-solution, subjecting the sludge to sufficient heat and pressure for a period of time to effect the interchange of the potassium of the mineral and the sodium of the solution, removing the sodium chloride from the liquor, and removing the potassium chloride from such liquor, substantially as described.

5. A process for the production of potassium chloride from leucite or the like, comprising wet grinding of the mineral in a sodium chloride solution fed to the grinding apparatus from a salt solution supply, thickening the resulting pulp by removing a portion of its salt solution and returning the latter to said supply, proportioning the ingredients of the sludge by the addition of salt solution from said supply, subjecting the sludge to sufficient heat and pressure for a period of time to effect the interchange of the potassium of the mineral and the sodium of the solution, and removing the potassium chloride from the liquor, substantially as described.

6. A process for the production of potassium chloride from leucite or the like, comprising wet grinding of the mineral in a sodium chloride solution fed to the grinding apparatus from a salt-solution supply, thickening the resulting pulp by removing a portion of its salt-solution and returning the latter to said supply, proportioning the ingredients of the sludge by the addition of salt-solution from said supply, subjecting the sludge to sufficient heat and pressure for a period of time to effect the interchange of the potassium of the mineral and the sodium of the solution, removing the sodium chloride from the liquor, and removing the potassium chloride from such liquor, substantially as described.

7. A process for the production of potassium chloride from leucite or the like, comprising wet grinding of the mineral in a sodium chloride solution fed to the grinding apparatus from a salt-solution supply, thickening the resulting pulp by removing a portion of its salt-solution and returning the latter to said supply, proportioning the ingredients of the sludge by the addition of salt-solution from said supply, subjecting the sludge to sufficient heat and pressure for a period of time to effect the interchange of the potassium of the mineral and the sodium of the solution, removing the sodium chloride from the liquor and returning it to said salt-solution supply, and removing the potassium chloride from such liquor, substantially as described.

8. A process for the production of potassium chloride from leucite or the like, comprising wet grinding of the mineral in a sodium chloride solution fed to the grinding apparatus from a salt-solution supply, thickening the resulting pulp by removing a portion of its salt-solution and returning the latter to said supply, proportioning the ingredients of the sludge by the addition of salt-solution from said supply, subjecting the sludge to sufficient heat and pressure for a period of time to effect the interchange of the potassium of the mineral and the sodium of the solution, washing the sludge, separating the liquor from the washed sludge, removing the sodium chloride from said liquor, and removing the potassium chloride from said liquor, substantially as described.

9. A process for the production of potassium chloride from leucite or the like, comprising wet grinding of the mineral in a sodium chloride solution fed to the grinding apparatus from a salt-solution supply, thickening the resulting pulp by removing a portion of its salt-solution and returning the latter to said supply, proportioning the ingredients of the sludge by the addition of salt-solution from said supply, subjecting the sludge to sufficient heat and pressure for a period of time to effect the interchange of the potassium of the mineral and the sodium of the solution, washing the sludge, separating the liquor from the washed sludge, removing the sodium chloride from said liquor and returning it to said salt-solution supply, and removing the potassium chloride from such liquor, substantially as described.

10. A process for the production of potassium chloride from leucite or the like, comprising wet grinding of the mineral in sodium chloride solution of about 20 to 25 per cent sodium chloride, thickening the resulting pulp by removing a portion of its salt-solution, proportioning the ingredients of the sludge by the addition of salt solution of substantially the same strength, subjecting the sludge to sufficient heat and pressure for a period of time to effect the interchange of the potassium of the mineral and the sodium of the solution, removing the sodium chloride from the liquor, and removing the potassium chloride from such liquor, substantially as described.

11. A process for the production of potassium chloride from leucite or the like, comprising continuous wet grinding of the mineral in a sodium chloride solution, subsequent continuous proportioning of the ingredients of the sludge by the addition of sodium chloride solution, continuous subjection of the sludge to sufficient heat and pressure for a period of time to effect the interchange of the potassium of the mineral and the sodium of the solution, and continuous removal of the potassium chloride from the liquor, substantially as described.

12. A process for the production of potassium chloride from leucite or the like, comprising continuous wet grinding of the mineral in a sodium chloride solution, subsequent continuous proportioning of the ingredients of the sludge by the addition of sodium chloride solution, continuous subjection of the sludge to heat and pressure for a period of time sufficient to effect the interchange of the potassium of the mineral and the sodium of the solution, continuous separation of the liquor from the solid material, continuous removal of the sodium chloride from the liquor, and continuous removal of the potassium chloride from such liquor, substantially as described.

13. A process for the production of potassium chloride from leucite or the like, comprising continuous wet grinding of the mineral in a sodium chloride solution, continuous thickening of the resulting pulp by continuously removing a portion of its salt solution, continuous proportioning of the ingredients of the sludge by the addition of sodium chloride solution, continuous subjection of the sludge to heat and pressure for a period of time sufficient to effect the interchange of the potassium of the mineral and the sodium chloride of the solution, and continuous removal of the potassium chloride from the liquor, substantially as described.

14. A process for the production of potassium chloride from leucite or the like, comprising continuous wet grinding of the mineral in a sodium chloride solution, continuous thickening of the resulting pulp by continuously removing a portion of its salt solution, continuous proportioning of the ingredients of the sludge by the addition of salt solution, continuous subjecting of the sludge to sufficient heat and pressure for a period of time to effect the interchange of the potassium of the mineral and the sodium of the solution, continuous separation of the liquor from the solid material, continuous removal of the sodium chloride from the liquor, and continuous removal of the potassium chloride from such liquor, substantially as described.

15. A process for the production of potassium chloride from leucite or the like, comprising continuous wet grinding of the mineral in a sodium chloride solution continuously fed to the grinding apparatus from a salt-solution supply, continuous thickening of the resulting pulp by removing a portion of its salt solution and continuously returning the latter to said supply, continuous proportioning of the ingredients of the sludge by the addition of salt-solution from said supply, continuous subjecting of the sludge to sufficient heat and pressure for a period of time to effect the interchange of the potassium of the mineral and the sodium of the solution, continuous removal of the sodium chloride from the liquor, and continuous removal of the potassium chloride from such liquor, substantially as described.

16. A process for the production of potassium chloride from leucite or the like, comprising continuous wet grinding of the mineral in a sodium chloride solution of about twenty to twenty-five per cent sodium chloride continuously fed to the grinding apparatus from a salt-solution supply, continuous thickening of the resulting pulp by continuously removing a portion of its salt-solution and continuously returning the latter to said supply, continuous proportioning of the ingredients of the sludge by the addition of salt-solution from said supply producing a sludge containing by weight approximately three parts of leucite, about one part of sodium chloride, and practically four to five parts of water, continuously subjecting the sludge to a steam pressure of approximately two hundred pounds per square inch for a period of time sufficient to effect the interchange of the potassium of the mineral and the sodium of the solution, continuous washing of the sludge, continuous separation of the liquor from the washed sludge, continuous removal of the sodium chloride from the liquor, and continuous removal of the potassium chloride from such liquor, substantially as described.

17. A process for the production of potassium chloride from leucite or the like, comprising wet grinding of the mineral in a sodium chloride solution fed to the grinding apparatus from a salt-solution supply, thickening the resulting pulp by removing a portion of its salt-solution and returning the latter to said supply, proportioning the ingredients of the sludge by the addition of salt solution from said supply, effecting the interchange of the potassium of the mineral and the sodium of the solution by passing the sludge through a group of digesters in series subjected to steam pressure, heating the ingoing sludge by the sludge discharged from such digesters, washing the sludge by a current of water flowing countercurrent to the travel of the sludge, separating the strong solution from the washed sludge, clarifying such solution, concentrating said solution by a quadruple effect evaporator, precipitating the sodium chloride out of the strong liquor discharged from the quadruple effect evaporator by an evaporation fractionation apparatus, returning the precipitated sodium chloride to the salt-solution supply, cooling and agitating the remaining liquor, separating out the potassium chloride by a centrifuge, and returning the mother-liquor to the evaporation fractionation apparatus, substantially as described.

18. A process for the production of potassium chloride from leucite or the like, comprising continuous wet grinding of the mineral in a sodium chloride solution fed continuously to the grinding apparatus from a salt-solution supply, continuous thickening of the resulting pulp by removing a portion of its salt-solution and continuously returning the latter to said supply, continuous proportioning of the ingredients of the sludge by the addition of salt-solution from said supply producing a pulp containing by weight approximately three parts of leucite, about one part of sodium chloride, and practically four to five parts of water, continuous effecting of the interchange of the potassium of the mineral and the sodium of the solution by continuously passing the sludge through a group of digesters in series subjected to a steam pressure of approximately two hundred pounds per square inch, continuous heating of the ingoing sludge by the sludge discharged from such digesters, continuous washing of the sludge by a current of water flowing countercurrent to the travel of the sludge, continuous separation of the strong solution from the washed sludge, continuous clarifying of such solution, continuous concentration of such solution by a quadruple effect evaporator, continuous precipitation of the sodium chloride out of the strong liquor discharged from the quadruple effect evaporator by an evaporation fractionation apparatus, continuous return of the precipitated sodium chloride to the salt-solution supply, continuous cooling and agitating of the remaining liquor, continuous separating out of the potassium chloride from the liquor by a centrifuge, and continuous return of the mother liquor to the evaporation fractionation apparatus, substantially as described.

MARK SHOELD.